Figure 1:
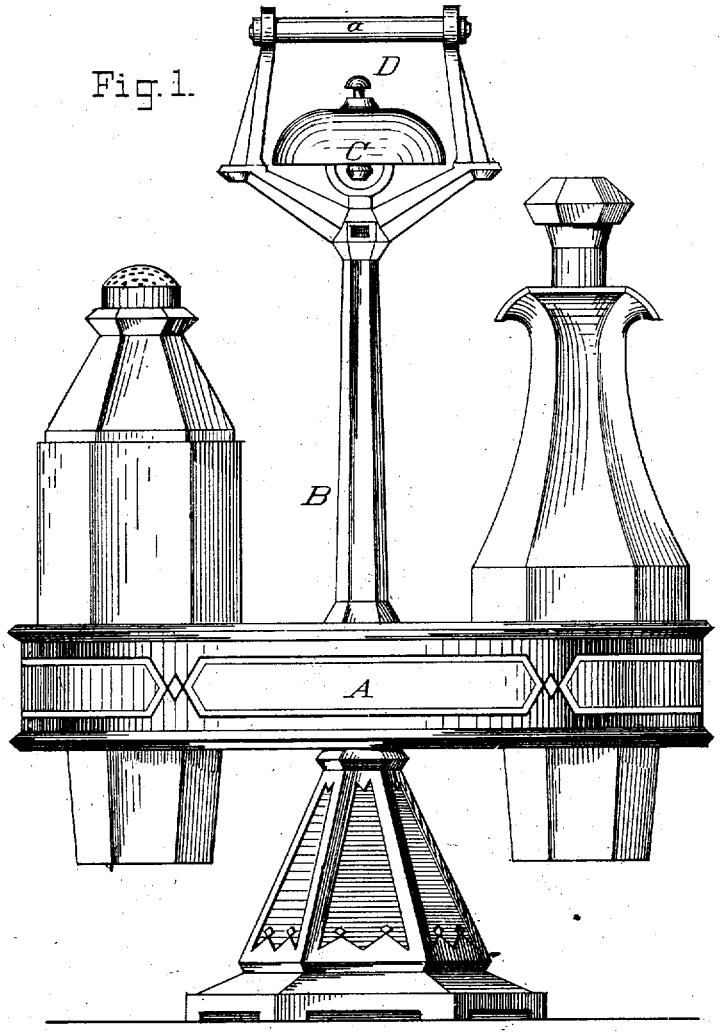

H. A. DIRKES.

TABLE-CASTER.

No. 7,541. Reissued Feb. 27, 1877.

Witnesses:

George W. Thatcher

Arthur C. Fraser.

Inventor:

Henry A. Dirkes

Per Burke & Fraser

Attys.

N. PETERS, PHOTO-LITHOGRAPHER, WASHINGTON, D. C.

UNITED STATES PATENT OFFICE.

HENRY A. DIRKES, OF NEW YORK, N. Y.

IMPROVEMENT IN TABLE-CASTERS.

Specification forming part of Letters Patent No. 95,572, dated October 5, 1869; reissue No. 7,541, dated February 27, 1877; application filed December 3, 1875.

*To all whom it may concern:*

Be it known that I, HENRY A. DIRKES, of the city, county, and State of New York, have invented certain Improvements in Table-Casters and similar utensils, of which the following is a specification:

This invention relates to that class of table utensils which are provided with annunciators, the object being to enable any sitter at the table to understand that there is an annunciator connected with the utensil, and also to place the operative mechanism within easy reach of all.

The invention consists, essentially, in the arrangement and construction of the parts in such a manner as to fulfill the above-named requirements, as will be hereinafter specified.

In the drawings, Figure 1 is a side view of a utensil substantially embodying my improvement.

Let A represent the body portion of a utensil, and B a central stem, to which a lifting-handle, *a*, is attached. C is an annunciator, which may be a gong or bell of any ordinary kind.

This annunciator, which includes the operating mechanism as well as a gong, is mounted upon the central stem of a caster or similar utensil, substantially as represented, so as to be visible and readily accessible to be sounded from any or all sides.

It will be seen that my invention is especially adapted to table utensils having central stems which rise above the receptacles in the stand; and it is on this stem that the annunciator is placed, as shown, far enough up to be visible above the bottles or receptacles.

I am aware that table-casters have been constructed to embrace with them a bell, in connection with other devices; but in all such cases not only the bell has been concealed from view, but the handle for operating it has been so placed as to be visible and capable of being operated from one side of the table only, and the person sitting at the opposite side remains in ignorance of there being a bell connected with the utensil. Unless he sits directly facing the handle it is inconvenient or impossible for him to sound the bell.

It will be readily seen how my improvement obviates these defects.

What I claim, and desire to secure by Letters Patent, is—

1. The bell or gong and its operative mechanism, arranged upon the top or upper portion of the stem of a table-caster or similar utensil, so that each may be supported and upheld by said stem, and be visible and equally accessible from all sides, substantially as herein set forth.

2. The arrangement of an annunciator as a whole, mounted on the stem of a caster or table utensil, above the band or other support for the receptacles, as and for the purposes substantially as set forth.

3. The arrangement, within the bow of the handle of a caster or similar table utensil, of the gong C and its operating-lever, whereby the latter are entirely exposed to view, removed from the receptacles, and adapted to be operated as and for the purposes set forth.

HENRY A. DIRKES.

Witnesses:

HENRY CONNETT,

ARTHUR C. FRASER.